United States Patent [19]

Nishihara et al.

[11] Patent Number: 4,465,736
[45] Date of Patent: Aug. 14, 1984

[54] SELECTIVELY LIGHT TRANSMITTING FILM AND PREFORMED LAMINAR STRUCTURE

[75] Inventors: Toshio Nishihara, Yamaguchi; Tadashi Shingu; Nobuo Suzuki, both of Tokyo, all of Japan

[73] Assignee: Teijin Limited, Osaka, Japan

[21] Appl. No.: 435,184

[22] Filed: Oct. 19, 1982

[30] Foreign Application Priority Data

Oct. 19, 1981 [JP] Japan ................................. 56-165603
Oct. 19, 1981 [JP] Japan ................................. 56-165605
Oct. 20, 1981 [JP] Japan ................................. 56-166402

[51] Int. Cl.³ .......................... B32B 15/08; B32B 27/42
[52] U.S. Cl. .................................... 428/332; 156/106; 428/334; 428/458; 428/460; 428/480; 428/699
[58] Field of Search ............... 428/458, 332, 457, 412, 428/333, 215, 437, 334, 699, 480; 427/164; 156/106

[56] References Cited

U.S. PATENT DOCUMENTS

| 3,718,535 | 2/1973 | Armstrong et al. | 428/457 |
| 3,816,201 | 6/1974 | Armstrong et al. | 156/106 |
| 3,962,488 | 6/1976 | Gillery | 427/164 X |
| 4,017,661 | 4/1977 | Gillery | 428/412 |
| 4,166,876 | 9/1979 | Chiba et al. | 428/215 |
| 4,226,910 | 10/1980 | Dahlen et al. | 428/458 X |
| 4,234,654 | 11/1980 | Yatabe et al. | 428/333 |

Primary Examiner—Thomas J. Herbert, Jr.
Attorney, Agent, or Firm—Sughrue, Mion, Zinn, Macpeak, and Seas

[57] ABSTRACT

Selectively light transmitting or electrically conductive film having a heat shrinking property and preformed self-supporting flexible laminar structure including said film, which are suitable for a safety glass-type construction use with a good appearance.

14 Claims, 2 Drawing Figures

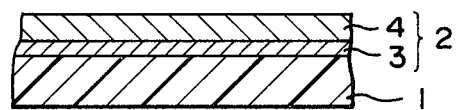
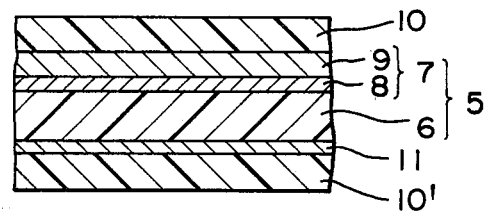

SELECTIVELY LIGHT TRANSMITTING FILM AND PREFORMED LAMINAR STRUCTURE

BACKGROUND OF THE INVENTION

This invention relates to a selectively light transmitting (here light is used in a comprehensive sense to cover ultraviolet and infrared rays as well as visible radiation) or electrically conductive multilayer sheet material. More specifically it relates to a selectively light transmitting or electrically conductive film and a preformed self-supporting flexible laminar structure made therefrom.

In recent years, research and development of a selectively light transmitting film represented by a heat reflecting film or solar radiation controlling film have been prosecuted energetically with the object of saving energy in air conditioning by applying to building windows and the like. In U.S. Pat. Nos. 4,166,876, 4,226,910 and 4,234,654, for instance, the selectively light transmitting film is disclosed.

Further, U.S. Pat. No. 3,718,535 points out that it is well known that resistance to shatter in a window, aircraft canopy, windshield or the like can be markedly enhanced by providing a safety glass-type construction, i.e., one wherein flexible plastic interlayer films are disposed between and laminated to rigid transparent dielectric plies of, e.g., glass or polymethyl methacrylate. Furthermore, it is proposed to obtain a safety glass-type defroster by making the safety glass-type construction electrically powerable with a film bearing on at least one surface a thin electrically conductive metal coating placed in the construction. In U.S. Pat. Nos. 3,718,535, 3,816,201, 3,962,488, and 4,017,661, the safety glass-type defroster is disclosed. Also in UK Pat. No. 1,586,889 and Japanese patent application Laid-Open 32352/81, it is proposed to make a safety glass-type construction by use of a heat reflective film.

In case where a functional safety glass-type construction is formed by placing a functional film, which is made to have a function to reflect heat, control solar radiation, or conduct electricity, in a safety glass-type construction, it is necessary to see that the presence of such functional film will not degrade the resistance to shatter and further that the appearance will not be injured.

As a result of patient study to achieve the abovementioned objects, the inventors of the instant invention have come to find that, when the base film of said functional film is made thin in thickness, the presence of the functional film does not cause the degradation of the resistance to shatter of the safety glass-type construction and also that the fitability of a sag-formed doublet glass is improved. However, it has also come to be noted that, when the base film is made thin, the film develops wrinkles or creases in the safty glass-type construction, which deteriorate the see-through transparency, deforms the reflected image, and ruins the appearance, thus much detracting the commercial value of the construction. Therefore, the inventors have continued the study in an effort to obtain a functional film which will not ruin the appearance and have finally completed the instant invention.

SUMMARY OF THE INVENTION

According to this invention, there are provided a selectively light transmitting or electrically conductive film (hereinafter often referred to as a functionized film) composed of
 (1) a carrier film of transparent polymer film in less than about 125 μm thickness, and
 (2) a thin selectively light transmitting or electrically conductive coating borne on at least one surface of the carrier film, and
having the heat shrinkage in a range expressed by the formulae $$4.4 \geq E \geq 0.00028 \times (d - 128)^2$$

$$d < 125$$

where E represents the heat shrinkage in % and d represents a thickness of the functionized film in μm, and a preformed self-supporting flexible laminar structure primarily defined in two dimensions (i.e. length and width substantially greater than thickness) and transparent when its exterior surfaces are flat and smooth composed of
 (i) a selectively light transmitting or electrically conductive film mentioned above (i.e. functionized film),
 (ii) a first interlayer film 0.001 mm to 1 mm thick adhered to the thin selectively light transmitting or electrically conductive coating side of said carrier film, the opposite blank surface of said interlayer film adhered to said thin selectively light transmitting or electrically conductive coating presenting an exterior surface of said laminar structure, and
 (iii) said laminar structure being adapted for further lamination between rigid transparent plies to form a safety glass-type construction.

A selectively light transmitting or electrically conductive film of the instant invention is a heat-shrinkable one and promises a good resistance to shatter and a good appearance when it is used to form the safety glass-type construction disregard of whether it is used in combination with a preformed self-supporting flexible laminar structure or independently.

A preformed self-supporting flexible laminar structure of the instant invention promises the abovementioned advantages and it is a product of an intermediate stage which is very conveniently used in the making of the safety glass-type construction.

BRIEF DESCRIPTION OF THE DRAWINGS

The advantages of the instant invention will become more apparant from the detailed description which follows and also from the attached drawings (not to scale) in which FIG. 1 depicts in cross-section a selective light transmitting or electrically conductive film formed according to one embodiment of this invention.

FIG. 2 depicts in cross-section a preformed self-supporting flexible laminar structure formed according to one embodiment of the invention.

DETAILED DESCRIPTION OF THE INVENTION

With reference now to FIG. 1, there is depicted a selectively light transmitting or electrically conductive coating 2 borne on the surface of a carrier film 1. The coating 2 shown in FIG. 1 is a coating of bi-layer type consisting of a metal layer 3 and a layer of dielectric material 4. Many proposals have hitherto been made relating to a selectively light transmitting coating or an electrically conductive coating. The oldest one can be traced back to a gold layer sandwiched with aluminum oxide layers proposed by W.H. Colbert et al. in [Bacuum] 3, 375, in 1953 and many types of coatings have since then been proposed including not only ones having a sandwich structure but also ones comprising a single metal layer and ones made in combination of a metal layer and a layer of a material having a high refrective index.

A metal oxide layer which is represented by indium tin oxide can singly become a selectively light transmitting coating or an electrically conductive coating and many proposals have been made with regard to such metal oxide layer.

These coatings are generally 50 Å to 5000 Å in thickness. The instant invention involves all selectively light transmitting or electrically conductive coatings of these types.

However, as a result of the study made by the inventors, it has been found that the following coatings are desirable. A thin metal layer of gold, silver, copper, aluminum, nickel, chromium, palladium, tin, and their alloy and a lamina obtained by laminating a dielectric layer to one surface or both surfaces of any of the above-mentioned metallic layers, for instance, may be mentioned. As the dielectric layer, layers of titanium oxide, bismuth oxide, zinc sulfide, tungsten oxide, indium oxide, zirconium oxide, silicon oxide, etc. may be mentioned.

Furthermore, a protective layer of titanium, zirconium, silicon, carbon, etc. may be formed, in thickness between 5 Å and 50 Å, in direct contact with one or both sides of abovementioned metal layer.

In case where said selectively light transmitting or electrically conductive film is used in making a safety glass for a building window, car window, etc., the window glass is required not to lose its proper brightness and also to have highly effective heat reflecting and solar radiation controlling functions, therefore, those systems obtained by laminating one or more than one layers comprising one or more than one kind of metal oxides selected from a group consisting of titanium oxide, bismuth oxide, tungsten oxide, indium oxide, zirconium oxide, and silicon oxide to one surface or both surfaces of a metallic or alloy layer of gold, silver, nickel, and chromium are desirably used. Especially a safety glass to be used for car windows must have 70% or more visible ray percent transmission and also is required to have excellent heat reflecting and solar radiation controlling functions and outstanding selectively light transmitting performance.

To meet such requirements, especially those systems obtained by laminating a layer, between 50 Å and 500 Å in thickness, comprising a mixture of one or more than one kind of metal oxides selected from a group consisting of titanium oxide, tungston oxide, indium oxide, and zirconium oxide to one surface or both surfaces of a metallic or alloy layer, between 50 Å and 200 Å in thickness, of silver, gold and copper are preferably selected.

More especially, those systems wherein the metal layer in the system mentioned above is protected by a layer deposited as titanium or zirconium on one or both surface are preferably selected.

In the instant invention the aforementioned selectively light transmitting or electrically conductive coating is carried on a carrier film such as a transparent polymer film, for example, a polyethylene terephthalate film, having specific properties. What is referred to as specific properties in the above is for the carrier film to satisfy the following formulae, when measured as the functionized film, in terms of thickness versus heat-shrinkage:

$$4.4 \geq E \geq 0.00028 \times (d-128)^2$$

$$d < 125$$

where E represents the heat shrinkage measured in % according to a method mentioned later and d represents a thickness of the functionized film in μm.

A more desirable range in which the abovementioned properties are effectively displayed is a range defined by the following formulae:

$$3.9 \geq E \geq 0.00028 \times (d-130)^2$$

$$d < 125$$

A safety glass-type construction displays such marked effects as mentioned below when it is prepared with the use of a selectively light transmitting or electrically conductive film which satisfies the above conditions:

(1) The resistance to shatter does not decrease because of a small thickness of the functionized film.

(2) Because of the appropriate heat shrinkage of the functionized film, very small creases, which develop inevitably when the interlayer film and rigid transparent plies are laid together to form a safety glass-type construction, vanish away due to the shrinkage of the functionized film occurring under the conditions of forming the safety glass-type construction (for instance, 90~150° C., 5~20 kg/cm², and 10 min. to 1 hour in case where the interlayer film is a polyvinyl butyral film).

As mentioned in the above, one conspicuous feature of this invention is that the selectively light transmitting or electrically conductive film is endowed with a property of heat shrinkage; however, if a degree of this heat shrinkage is too great, too much shrinkage occurs at the time of making the safety glass-type laminate and causes the selectively light transmitting or electrically conductive coating to break itself.

A selectively light transmitting or electrically conductive film of this type can be prepared by forming a metal layer and/or dielectric material layer in an appropriate combination on a carrier film such as biaxially oriented polyethylene terephthalate film having the heat shrinkage of at the most 5%, preferably satisfying the formulae mentioned for the functionized film, for instance, according to the physical vapour deposition method and/or wet coating method which are disclosed in U.S. Pat. Nos. 3,698,946, 3,962,488, 4,017,661 4,166,876, 4,234,654, UK Pat. Nos. 1,230,425, 1,364,712 and European Patent Publication No.35906.

Since the carrier film has the heat shrinkage, caution must be exercised not to allow the carrier film to be exposed to the extreme heat for a long time before use during or after the process of making the functionized film.

The abovementioned desirable film structure also makes a desirable embodiment of the instant invention in view of the easiness of its preparation.

Though no limit is placed on the uses of the selectively light transmitting or electrically conductive film obtained according to the instant invention, it is most fitted for the making of a stretched film window as disclosed in Japanese Patent Application Laid-Open Nos. 100988/81, 120548/81 and the aforementioned safety glass-type construction, of which the latter is especially desirable. In the making of a safety glass-type construction with the use of the abovementioned film, the construction may be prepared by laying said film, the interlayer film and the rigid transparent plies one upon another independently; however, it is advisable for convenience of preparatory procedure to prepare beforehand a preformed self-supporting flexible laminar structure by laminating said film and the interlayer film. Now an explanation is made hereunder as to the second subject of the invention, i.e., a preformed self-supporting flexible laminar structure.

With reference to FIG. 2, there is depicted the selectively light transmitting or electrically conductive film 5 and interlayer films 10, 10' adhered to the thin selectively light transmitting or electrically conductive coating 7 and the carrier film 6.

A mode of layer system depicted in FIG. 2 is a mode of layer system with more plies of the instant invention but, as a matter of course, the instant invention is not limited to this. The selectively light transmitting or electrically conductive film 5 shown in FIG. 2 is formed by laying the thin selectively light transmitting or electrically conductive coating 7, which consists of the metal layer 8 and the layer of dielectric material 9, on the forementioned carrier film 6. The selectively light transmitting or electrically conductive film 5 is sandwiched in between the interlayer films 10 and 10'. An adhesive layer 11 is placed between the interlayer film 10' and the carrier film 6 to secure the adherence.

As the interlayer film, any materials whose uses are publicly known in the technical field of safety glass, for example U.S. Pat. No. 3,718,535, such as polyvinyl butyral, for instance, can be used. Usually, its thickness is in the range of 0.01 mm to 1 mm, more preferably in the range of 0.1 mm to 0.9 mm.

It is desirable to allow this interlayer film to have a lowered heat shrinkage and that in both the two directions biaxially.

The desirable range of heat shrinkage is at most about 10% in both machine drive and traverse directions, more desirably at most 5%, and it is especially desirable to be 3% at the most.

A commercially available interlayer film such as polyvinyl butyral film has a considerably great heat shrinkage in one direction and yet thermally expands in another direction crossing biaxially. Because of this unbalance in its thermal behavior, it is not advisable to use the film without subjecting it to any treatment in the instant invention.

When a polyvinyl butyral film is used in the instant invention, it must be heat-treated beforehand so that its modified physical properties may satisfy the aforementioned conditions.

Furthermore, when a polyvinyl butyral film is to be used as the interlayer film of safety glass, it must be embossed on both surfaces, for example, to look like textured. The interlayer film, a polyvinyl butyral film, for instance, to be used in this invention should desirably be flat and smooth at least on one surface which is made to contact the thin selectively light transmitting or electrically conductive coating when the safety glass-type construction is formed before it is integrated with the selectively light transmitting or electrically conductive film.

If it is not flat and smooth, the uneven surface of the interlayer film affects the thin selectively light transmitting or electrically conductive coating adversely and influence the appearance of the finally completed safety glass-type construction for bad.

Another merit of flat and smooth surface is that it enhances the adhesiveness between the surfaces when the two films are subjected to heat and pressure lamination.

As shown in FIG. 2, the instant invention involves a sandwich structure in which the selectively light transmitting or electrically conductive film 5 is placed between the first interlayer film 10 and the second interlayer film 10' as a desirable mode of embodiment and in this case it is desirable to establish an appropriate adhesive layer 11 between the second interlayer film 10' and the carrier film 6. As the adhesive layer, any adhesive publicly known to persons skilled in this line of arts may be usable; however, it is advisable to use a thin layer of metal oxide such as titanium oxide or zirconium oxide which is obtained by hydrolyzing the coating of metal alkoxide such as tetrabutyl titanate or tetrabutoxy zirconate, for instance, applied to the surface of the film. The thickness of an adhesive layer is usually 50 Å to 1000 Å, preferably 100 Å to 500 Å.

The surface of the second interlayer film which contacts the carrier film is not necessarily to be made flat and smooth prior to the formation of the self-supporting flexible laminar structure, however, it is preferable to make it flat and smooth in view of the enhancement of the adhesiveness.

The method mentioned in the above remarkably enhances the adhesiveness of the interface between the first interlayer film and the thin selectively light transmitting or electrically conductive coating and the interface between the second interlayer film and the carrier film. The adhesiveness should desirably be 20 g/cm at the least and 50 g/cm at the least is especially desirable.

As the desirable composition of a preformed self-supporting flexible laminar structure of the instant invention, the following may be mentioned:

(1) PVB/PET/titanium oxide/Ag - Cu/titanium oxide/PVB
(2) PVB/titanium oxide/PET/Ti*/Ag - Cu/ Ti*/-titanium oxide/PVB
(3) PVB/titanium oxide/PET/Ag - Au/ mixture of zirconium oxide and silicon oxide/PVB
(4) PVB/titanium oxide/PET/indium tin oxide/Ag/indium tin oxide/PVB
(5) PVB/titanium oxide/PET/Au/titanium oxide/PVB
* deposited as Ti The preformed self-supporting flexible laminar structure can generally be obtained by laminating the interlayer film such as polyvinyl butyral film to said selectively light transmitting or eletrically conductive film under pressure at considerably low temperature of 20° to 100° C., for instance.

The preformed self-supporting flexible laminar structure can also be obtained by laminating the interlayer film such as polyvinyl butyral film coming out of the extruder to the selectively light transmitting or electrically conductive film, followed by embossing the outer surface if required.

Measurement of Heat Shrinkage E of a Carrier Film

On the specimen of a carrier film with a thin selectively light transmitting coating a distance of lo cm is marked down in the machine drive direction and in the traverse direction respectively. The specimen is then placed in the oven at 120° C. for 30 minutes, taken out of the oven, and allowed to cool to room temperature. The marked distance 1 cm on the film after heating is measured. The heat shrinkage E is calculated by the following equation:

$$E = \frac{lo - l}{lo} \times 100 \, (\%)$$

Measurement of Heat Shrinkage of an Interlayer Film

An interlayer film is placed on a polyethylene terephthalate sheet with its surface treated with silicone beforehand. A distance of Lo cm is marked down on the interlayer film in the machine drive direction and in the traverse direction respectively. The polyethylene terephthalate sheet with the interlayer film placed on it is then placed in the oven and heated at 70° C. for 30 minutes, taken out of the oven, and allowed to cool to the room temperature. The marked distance L cm after heating is measured. The heat shrinkage is calculated by the following formula:

$$\frac{Lo - L}{Lo} \times 100 \, (\%)$$

Measurement of Adhesiveness of a Laminar Structure

A piece of laminar structure, 1 cm wide and 10 cm long, is set to the tension tester (ASTMD-882-67). With the end of the carrier film the laminar structure fixed, the end of the interlayer film of the laminar structure is pulled at the rate of 2 cm/sec. in the direction opposite to the point where said carrier film is fixed to read the adhesiveness in g/cm between the carrier film and the interlayer film.

EXAMPLE 1

A selectively light transmitting and electrically conductive film was prepared by laminating one upon another a titanium layer having a thickness of 10 Å as the first layer, a layer of silver and copper alloy having a thickness of 120 Å as the second layer, a titanium layer having a thickness of 20 Å as the third layer, and a layer of titanium oxide having a thickness of 200 Å as the fourth layer on the substrate of biaxially stretched polyethylene terephthalate film having a thickness of 100 μm.

A layer of titanium oxide having a thickness of 200 Å had been laminated to one surface of the polyethylene terephthalate film used as the substrate before said first to fourth layers were laminated to the other side of the substrate.

The above layer of titanium oxide was formed by coating a solution, comprising two parts of n-hexane and one part of n-butanol, containing 5% by weight of tetrabutyl titanate with a bar coater, followed by drying at 70° C. for 5 minutes. Also the fourth layer of titanium oxide was formed in the same way.

The first and the third titanium layers were formed by means of DC magnetron sputtering of a titanium metal target in an atmosphere of argon under pressure of $2.0 \times 10^{-3}$ Torr while cooling the substrate film with a refrigerant of $-10°$ C. The second layer of silver and copper alloy was formed by means of DC magnetron sputtering of a silver metal target containing 10% by weight of copper in an atmosphere of argon under pressure of $5.0 \times 10^{-3}$ Torr while cooling the substrate film with a refrigerant of $-10°$ C.

The heat shrinkage of thus obtained film was 0.8% in the traverse direction (TD) and 0.8% in the machine drive direction (MD).

A laminar structure was then obtained by laminating a polyvinyl butyral sheet having a thickness of 0.38 μm on both surfaces of the film thus obtained.

The polyvinyl butyral sheets used in the making of the laminar structure had the heat shrinkage of 1.1% in MD and 2.0% in TD. Each polyvinyl butyral sheet had its one surface made flat and smooth and another surface embossed, and the flat and smooth surface of each sheet was made to contact said film to make the laminar structure.

The adhesiveness between the film and the polyvinyl butyral sheet of thus obtained laminar structure was 340 g/cm.

The laminar structure was then laid between two sheets of plate glass each having a thickness of 2 mm and they were placed in a rubber bag. The rubber bag was held horizontally and after it was kept vacuous for 5 minutes it was further maintained at 90° C. for 30 minutes. The layer of two panes of glass with the laminar structure held between them was taken out of the rubber bag and then autoclaved under temperature of 120° C. and pressure of 14 kg/cm$^2$·G for about 30 minutes to prepare a sheet of laminated glass. The visible ray percent transmission of the laminated glass thus prepared was 73% and its solar energy percent transmission was 58%. A sample of laminated window glass which has a good see-through transparency and produces a uniform reflected image has been obtained in this way.

Also a curved laminated glass was prepared by laminating two pieces of glass having a radius of curvature of 3 cm and thickness of 2 mm to both sides of said laminar structure according to the same process as the aforementioned laminated glass plate and it has likewise a good appearance.

COMPARISON 1

A selectively light transmitting and electrically conductive film was prepared according to Example 1, wherein a polyethylene terephthalate film having a thickness of 12 μm instead of 100 μm was used as a substrate. The heat shrinkage of thus obtained film was 5.0% in TD and 4.5% in MD.

A laminated glass prepared by use of the above film and the same polyvinyl butyral sheet as Example 1 according to the same procedure as Example 1 was found not producing an uneven reflected image but showing numerous small cracks on the film placed inside the laminated glass.

COMPARISON 2

A selectively light transmitting and electrically conductive film was prepared according to Example 1, wherein a polyethylene terephthalate film having a thickness of 25 μm instead of 100 μm was used as a substrate. The heat shrinkage of thus obtained film was 2.0% in TD and 1.6% in MD. A laminated glass prepared according to the same method as Example 1 with the use of the film prepared in the above had an unsatisfactory see-through transparency and produced an uneven reflected image.

COMPARISON 3

A selectively light transmitting and electrically conductive film prepared according to Example 1, wherein a polyethylene terephthalate film having a thickness of 175 μm instead of 100 μm was used, had the heat shrinkage of 0.1% in TD and 0.01% in MD. A laminated glass prepared according to the same method as Example 1 with the use of the above film had the visible ray percent transmission of 70% and the solar energy percent transmission of 55%. The laminated glass prepared of plate glass had a good appearance; however, a curved laminated glass made of two pieces of glass of the same radius of curvature as Example 1 had a poor appearance and seethrough transparency, produced a deformed reflected image, and presented many cracks on the film laid inside.

EXAMPLE 2

A layer of titanium oxide 300 Å thick prepared from tetrabutyl titanate was formed on one surface of a biaxially oriented polyethylene terephthalate film having a thickness of 100 μm according to Example 1. Three layers consisting of a 250 Å thick titanium oxide layer as the first layer, a 100 Å thick silver layer as the second layer, and again a 250 Å thick titanium oxide layer as the third layer were formed on the blank reverse surface of said polyethylene terephthalate film previously coated with a layer of titanium oxide to obtain a selectively light transmitting film.

The abovementioned first and third layers of titanium oxide were formed in the RF sputtering device with the use of a target of titanium oxide in an atmosphere of argon under pressure of $2.0 \times 10^{-3}$ Torr while cooling the substrate film by use of a coolant of 20° C. The second layer of silver was formed according to Example 1. The heat shrinkage of thus obtained film was 1.8% in TD and 2.0% in MD.

Then a laminar structure was prepared by laminating a polyvinyl butyral sheet 0.38 μm thick blended with 1.0% by weight of an ultraviolet absorber of Tinuvin ® 328 (CIBA-GEIGY A.G.) to both surfaces of the film at 50° C.

The heat shrinkage of the polyvinyl butyral sheet used in the above was 2.0% in MD and 2.2% in TD. Its flat and smooth surface was bonded to the film and the outmost surface of said laminar structure was embossed.

The adhesiveness between the film of the laminar structure and the polyvinyl butyral sheet was 365 g/cm. A laminated glass prepared by sandwiching the film between two panes of plate glass 2 mm thick according to Example 1 had the visible ray percent transmission of 75% and the solar energy percent transmission of 65%. Also an excellent laminated window pane which had a good see-through transparency and produced a reflected image free from deformation and unevenness.

EXAMPLE 3

A selectively light transmitting film was obtained by coating indium tin oxide (containing 7.0 wt % of tin oxide) to a thickness of 3500 Å on a substrate film of biaxially oriented polyethylene terephthalate film 50 μm thick according to the reactive sputtering method.

The indium tin oxide coating was formed by use of a DC sputtering device in an atmosphere of mixed gas consisting of oxygen, argon, nitrogen, and hydrogen while cooling the substrate film with a coolant of 20° C. under pressure of $3.5 \times 10^{-3}$ Torr The heat shrinkage of the film thus obtained was 2.6% in TD and 2.0% in MD.

A laminated glass was then prepared by use of the same polyvinyl butyral sheet as Example 1 and the above film according to the same procedure as Example 1. Thus prepared laminated glass had the visible ray percent transmission of 74% and the solar energy percent transmission of 66%. It also had an excellent see-through transparency and reflected a uniform and faithful image.

The adhesiveness of the intermediate film obtained by sandwiching the polyvinyl butyral sheet was 10 g/cm.

EXAMPLE 4

A selectively light transmitting and electrically conductive film was obtained by laminating a layer of silver and gold alloy having a thickness of 100 Å as the first layer and a layer of zirconium oxide having a thickness of 200 Å as the second layer on a biaxially stretched polyethylene terephthalate film 50 μm thick which was used as a substrate film.

The abovementioned layer of silver and gold alloy was formed by use of a silver target containing 20% by weight of gold by means of DC sputtering according to Example 1. The layer of zirconium oxide was formed by applying a mixed solution of n-butanol and n-hexane containing 8.0% by weight of tetrabutoxy zirconate with a bar coater, followed by drying at 75° C. for 5 minutes with the use of a hot air drier.

The heat shrinkage of thus obtained film was 2.3% in TD and 2.2% in MD.

A laminar structure was then obtained by use of the film according to the same procedure as Example 1 and furthermore a laminated glass was prepared according to Example 1.

The laminated glass had the visible ray percent transmission of 70% and the solar energy percent transmission of 62%. The laminated glass had an excellent see-through transparency and produced uniform reflection.

What is claimed is:

1. A selectively light transmitting or electrically conductive film composed of
   (1) a carrier film of transparent polymer film in less than about 125 μm thickness, and
   (2) a thin selectively light transmitting or electrically conductive coating borne on at least one surface of the carrier film, and having the heat shrinkage in a range expressed by the formulae $$4.4 \geq E \geq 0.00028 \times (d-128)^2$$

$$d < 125$$

where E represents the heat shrinkage in % and d represents a thickness of the selectively light transmitting or electrically conductive film in μm.

2. A selectively light transmitting or electrically conductive film of claim 1, wherein the carrier film is a polyethylene terephthalate film of a thickness in a range of about 12 μm to about 125 μm.

3. A selectively light transmitting or electrically conductive film of claim 1, wherein the thin selectively light transmitting or electrically conductive coating is composed of a thin transparent metal layer optionally combined with at least one layer of dielectrical material.

4. A selectively light transmitting or electrically conductive film of claim 3, wherein the metal layer is formed of a metal selected from a group consisting of silver, gold, copper, and alloys thereof.

5. A selectively light transmitting or electrically conductive film of claim 4, wherein the metal layer has an additional metal layer of titanium, zirconium, silicon, or carbon on at least one side thereof.

6. A preformed self-supporting flexible laminar structure primarily defined in two dimensions and transparent when its exterior surfaces are smooth composed of
(i) A selectively light transmitting or electrically conductive film having a heat shrinkage in a range expressed by the formulae below $$4.4 \geq E \geq 0.00028 \times (d-128)^2$$

$$d < 125$$

where E represents the heat shrinkage in %, and d represents a thickness of the film in μm, and essentially consisting of a carrier film of transparent polymer film in less than about 125 μm thickness and a thin selectively light transmitting or electrically conductive coating placed on said carrier film,
(ii) a first interlayer film 0.001 mm to 1 mm thick adhered to the thin selectively light transmitting or electrically conductive coating on said carrier film, the opposite surface of said interlayer film adhered to said thin selectively light transmitting or electrically conductive coating side presenting the exterior surface of said laminar structure,
(iii) said laminar structure adapted for further lamination between rigid transparent plies to form a safety glass-type construction.

7. A preformed self-supporting flexible laminar structure of claim 6, wherein the interlayer film has the heat shrinkage of about 10% at the most in both machine drive and traverse directions.

8. A preformed self-supporting flexible laminar structure of claim 6, wherein the interlayer film has the heat shrinkage of about 5% at the most in both machine drive and traverse directions.

9. A preformed self-supporting flexible laminar structure of claim 6, wherein the interlayer film is a polyvinyl butyral film.

10. A preformed self-supporting flexible laminar structure of claim 6, wherein the thin selectively light transmitting or electrically conductive coating is composed of (i) a layer of metal or metal oxide and (ii) a metal oxide layer which is formed by physical vapor deposition method or by hydrolysis of metal alkoxide, and made to contact the interlayer film.

11. A preformed self-supporting flexible laminar structure of claim 6, wherein the opposite surface of the carrier film that formed the thin selectively light transmitting or electrically conductive coating thereon is covered with a metal oxide layer formed from the hydrolysate of metal alkoxide.

12. A preformed self-supporting flexible laminar structure of claim 6, wherein at least the surface of said interlayer film adhered to said thin selectively light transmitting or electrically conductive coating is made smooth before the laminar structure is formed and the adhesivity between the interlayer film and the thin selectively light transmitting or electrically conductive coating is at least 20 g/cm.

13. A preformed self-supporting flexible laminar structure of claim 6, wherein additional interlayer film is laid on the opposite surface of the carrier film that bears the thin selectively light transmitting or electrically conduction coating thereon.

14. A preformed self-supporting flexible laminar structure of claim 6, wherein the thin selectively light transmitting or electrically conductive coating is composed of
(i) a metal layer formed of a metal selected from a group consisting of silver, gold, copper and alloys thereof, and
(ii) a titanium oxide layer formed on one or both surfaces of the metal layer.

* * * * *